United States Patent

[11] 3,607,772

[72] Inventor Otto R. Kozak
 Long Beach, N.Y.
[21] Appl. No. 783,153
[22] Filed Dec. 11, 1968
[45] Patented Sept. 21, 1971
[73] Assignee I. R. Research
 Palo Alto, Calif.

[54] INFRARED SENSITIVE ZINC SULFIDE LUMINOPHORE
 2 Claims, No Drawings
[52] U.S. Cl. ................................................. 252/301.6,
 250/71.5
[51] Int. Cl. .................................................. C09k 1/12,
 G01j 1/58
[50] Field of Search ........................................ 252/301.6
 S; 250/71.5

[56] References Cited
 UNITED STATES PATENTS
 2,522,074 9/1950 Urbach ..................... 252/301.6 X

OTHER REFERENCES

Hradeovsky, " Chemical Abstracts," Vol. 55, P. 13082i and 13083a (1961)

Primary Examiner—Tobias E. Levow
Assistant Examiner—J. Cooper
Attorney—Fryer, Tjensvold, Feix, Phillips & Lempio ABSTRACT: A luminophore that is extremely sensitive to both low intensities and very long wavelengths of infrared radiation is described. The luminophore consists of very high purity zinc sulfide crystals that are sensitized to infrared radiation by adding minute quantities of the elements lead, cobalt and praseodymium thereto. The lead, cobalt and praseodymium-activated zinc sulfide crystals, when prepared in a suitable emulsion film, will detect infrared radiation having energies as low as $10^{12}$ electron volts and of wavelengths as long as 15 microns. When first "sensitized" by ultraviolet light and subsequent illumination by infrared radiation, the luminophores of the invention luminesce, generally within the visible red range of the spectrum, with color gradations all the way out to the blue, depending upon the intensity of infrared radiation received.

INFRARED SENSITIVE ZINC SULFIDE LUMINOPHORE

BACKGROUND OF THE INVENTION

The present invention relates to infrared radiation detectors and more specifically to infrared radiation detectors of the semiconductor crystalline type.

Any body above a temperature above 0° Kelvin emits energy in the form of radiation. The radiation emitted is a natural function of the motion of the atomic and molecular particles of which all matter is comprised. The radiation resulting from the oscillatory and rotatory movements of the molecules possesses energies falling within the so-called "infrared" region of the electromagnetic spectrum.

These infrared radiations extend beyond the red end of the visible spectrum into the longer wavelengths. The so-called near infrared portion of the spectrum extends from just beyond the visible red region out to about 25 microns, while the far infrared region extends to wavelengths longer than 25 microns.

An analysis of the infrared radiation associated with any object can reveal a great deal of information that is not readily available by any other means. This information may be obtained through an analysis of the infrared radiation that is continually being emitted from such objects or through an analysis of infrared radiation reflected from such objects when they are illuminated by an external infrared source. Such information finds great utility in most sciences including botany, pathology, forestry, paleontology, medicine, archeology, criminology, the military sciences, as well as studies relating to pure chemistry and physics. Infrared analysis also finds application in the commercial field, for instance in flaw detection of manufactured parts. Infrared information is also very useful in photogrammetry and aerial surveillance wherein infrared photography can reveal features obtainable in no other manner.

While the usefulness of infrared information is well recognized, the means for accurate detection and analysis of infrared radiation has only in recent years reached a state in which such methods can be widely and simply utilized. This increased use of infrared information has in great part been advanced through the development of crystalline semiconductor infrared detectors. It has been found that certain chemical compounds with heteropolar (ionic) bonds such as those found in the sulfides and oxides of various metallic elements such as zinc and cadmium, exhibit a sensitivity to infrared radiation. Crystalline compounds of such a nature when suitably purified, prepared and presensitized by ultraviolet radiation exhibit luminescense under infrared radiation. More specifically such materials have the property of converting infrared radiation which is nonvisible into radiation in the visible range of the electromagnetic spectrum. Although this phenomenon is well known, its mechanism remains for the greatest part still unclarified. Thus the technology of manufacturing semiconductor luminescent detectors still, to a certain degree, depends upon empirical data.

In the present invention a crystalline semiconductor infrared detector has been developed exhibiting and infrared induced luminescense which is sensitive both to low intensities as well as long wavelengths of infrared radiation. Not only is the infrared detector of the present invention extremely sensitive out to longer wavelengths and to lower energy levels, but in addition when suitably prepared in an emulsion, displays infrared pictures covering a broad range of colors in the visible spectrum.

More specifically, the infrared detector of the present invention comprises crystals of ultrapure zinc sulfide which are activated with very minute quantities of the elements lead, cobalt and praseodymium . Crystals of the semiconductor infrared detector, hereinafter referred to as "luminophore," are extremely sensitive to low levels of infrared radiation. Infrared energies in the order of $10^{12}$ electron volts will produce a measurable luminescense. Not only are the luminophores of the invention extremely sensitive to low energy levels of infrared radiation, but they are also sensitive to infrared radiations of very long wavelengths. For instance, infrared radiation with a wavelength even as high as 15 microns, will produce a clear and usable luminescense of the invention luminophores even at ambient temperatures.

It is therefore an object of the invention to provide a semiconductor crystalline luminophore that is sensitive to very long wavelengths of infrared radiation.

It is another object of the invention to provide a semiconductor crystalline luminophore sensitive to very low intensities of infrared radiation.

It is another object of the invention to provide an infrared detector consisting of ultrapure zinc sulfide activated with minute amounts of lead, cobalt and praseodymium.

It is yet another object of the invention to provide a zinc-sulfide-based luminophore that may be prepared as an emulsion film on a photographic plate to present a visual picture of the infrared radiations emitted from, or reflected from, any object.

It is yet another object of the present invention to provide a semiconductor crystalline luminophore that will convert infrared radiation into a red-based colored picture of any source from which the infrared radiations are detected.

Other objects and advantages of the invention will be apparent from a review of the following specification and appended claims.

DESCRIPTION OF THE PREFERRED EMBODIMENT

The semiconductor infrared detector or luminophore of the invention consists of crystals of highly pure zinc sulfide having small amounts of activator elements, specifically lead, cobalt and praseodymium, incorporated into the crystal structure. Other than the aforementioned activators the zinc sulfide crystals must be as free as possible from other contaminating elements. In this regard it is desirable that all impurities in the zinc sulfide be present in amounts no greater than $1\times10^{16}$ percent by weight. This percentage represents the aggregate amount of all impurities permissible in the zinc sulfide crystals. Preferably the aggregate amount of all impurities should be no greater than $1+10^{17}$ or even $1+10^{18}$ percent by weight. It is especially important that manganese and nickel be extremely low in the crystal structures. The presence of manganese and nickel to the extent of no greater than $1\times10^{18}$ percent by weight is especially desirable.

The presence of impurity elements in amounts greater than those aforementioned seriously degrades the infrared sensitivity of the luminophore as manifest by greatly decreased intensities of the infrared-induced luminescense. In fact the presence of impurity elements in amounts appreciably greater than those stated above will render the luminophores useless for the purposes of this invention.

On the other hand, the activator elements; i.e., lead, cobalt and praseodymium, are present in the zinc sulfide crystalline structure in amounts of from $1\times10^{15}$ to $1\times10^{17}$ percent by weight each. It is absolutely essential that each of the activator elements be present in the zinc sulfide luminophore within the range stated in order for the resultant product to achieve a sensitivity to infrared radiation out to wavelengths as long as 15 microns and to infrared intensities as low as $10^{12}$ electron volts. In addition the presence of the three activator elements, lead, cobalt and praseodymium, insure that the luminescense resulting from infrared exposure will cover the broad range of the visible spectrum referred to above.

Due to the very low level of impurities allowable in the luminophore product and the relatively narrow range of activator elements present therein, the utmost care must be taken in the selection of raw materials for use in manufacture of the luminophore as well as in the actual production process. It is absolutely necessary to start with the purest possible raw materials, to handle them in vessels of the least possible contaminating nature, as well as to carry out all operations in a controlled and uncontaminating environment. For instance, it is preferred to handle all of the materials utilized in preparation of the luminophores in silica or quartz vessels, and further to conduct all production operations in an "inert" atmosphere or under vacuum conditions.

It is absolutely essential to start the manufacturing operation with starting materials that are as free from contaminants as possible. Those skilled in the art will understand that chemical techniques such as multiple recrystallization, successive distillation, etc., must be utilized in order to obtain raw materials of the highest purity. Not only must the starting materials which are reacted to form the final luminophore product be of the highest purity, but in addition the various liquid solvents, slurrying liquids, and "atmospheric" gases utilized in the production process must also be of the highest possible purity.. In this regard it is necessary to utilize, for instance, triple-distilled, ion-free water or its equivalent, and spectrographically pure inert (e.g. argon) gases. In addition, any possible impurities that could adhere to the surfaces of the silica or quartz vessels utilized in the production process must be removed by the application of suitable cleaning agents, as well as successive rinsing in triple-distilled water.

The lead, cobalt and praseodymium-activated zinc sulfide luminophore of the invention is produced as follows: Reacting ultrapurified reagents in quartz vessels, there is first produced a highly pure zinc sulfide crystalline product. Specifically, zinc sulfide is precipitated from an aqueous zinc sulfate solution by bubbling highly purified hydrogen sulfide gas therethrough. The resultant zinc sulfide precipitate is rinsed a number of times with triple-distilled water to remove all residual sulfate ions therefrom.

The resultant zinc sulfide crystalline product is then subjected to sedimentation in order to select crystals of between 1 to 10 microns in diameter. This selected crystal fraction is then heated to about 110° C. in order to drive off most of the accompanying water. However, not all of the water is driven off and the crystals are permitted to remain wet.

The first activator element, lead, is then added to the selected zinc sulfide crystals as follows: The desired quantity of lead in the form of a soluble salt, as for instance lead chloride, is dissolved in a solvent such as highly purified water in an amount sufficient to furnish the aforementioned percentage of activator in the resultant zinc sulfide product. Due to the very small amount of activator necessary in the zinc sulfide product, it will be apparent that suitable dilution techniques must be employed in order to provide the proper amount of activator element in the contacting solution.

In any event, the lead chloride dissolved in the solvent has added thereto a coactivator salt, preferably sodium chloride. (It has been found that the presence of sodium chloride in the activation process enhances the ability of the activator elements to penetrate the crystal structure of the zinc sulfide. Its presence is highly desirable in the preparation of the luminophores.) This solution containing the proper amount of dissolved lead chloride and sodium chloride is thereupon added to the wet zinc sulfide product. The resultant mixture of zinc sulfide crystals and the solution of lead chloride and sodium chloride is slurried for a period of several hours under vacuum conditions.

After the mixing period the slurry is transferred to a furnace with a controlled inert atmosphere such as argon. The slurry is then heated to a temperature of at least 750° C., whereupon the solvent evaporates completely from the mixture leaving the lead chloride and salt in intimate contact with the zinc sulfide crystals. During the heating process, and possibly during the slurrying period, the lead migrates into the zinc sulfide crystals and is retained therein. After having been heated to the aforementioned temperature for a period of one-half hour or so, the zinc-sulfide, lead-activated crystals are then cooled to room temperature.

The lead activated zinc sulfide crystals are thereupon contacted with a second aqueous solution containing cobalt dissolved therein. For this purpose a soluble cobalt salt, such as cobalt nitrate, in a quantity sufficient to furnish the aforementioned range of cobalt in relation to the zinc sulfide is dissolved in water. This solution of cobalt salt is thereupon slurried with the lead activated zinc sulfide and the attendant sodium chloride that remains from the previous activation step.

After mixing with the zinc sulfide for several hours the slurry is then transferred to a furnace and heated to a temperature of approximately 900° C. for a period of at least one-half hour. As in the previous instance, the water is evaporated from the zinc sulfide salt, and at the same time the cobalt activator element migrates into the zinc sulfide crystal structure. The zinc sulfide is thereupon cooled as quickly as possible to room temperature to yield a product of zinc sulfide crystals activated with both lead and cobalt. The coactivator, sodium chloride, is of course still mixed with the zinc sulfide crystals.

The third activator element, i.e. praseodymium, is added to the zinc sulfide crystals in a manner quite similar to the previous two mentioned activation steps. More particularly a suitable praseodymium salt, e.g. praseodymium oxide, is dissolved in a solvent such as highly purified acetone. Once again the amount of praseodymium in the solvent is selected to secure the desired percentage of praseodymium in relation to the zinc sulfide crystals contacted. In any event the praseodymium oxide-acetone solution is slurried with the zinc sulfide crystals, and the accompanying coactivator sodium chloride. The slurrying continues for a period of several hours after which the mixture is transferred to a furnace where it is heated to a temperature of about 1,150° C. for a period of at least one-half hour in an inert atmosphere, such as argon.

During the heating period the solvent evaporates from the slurry leaving the zinc sulfide crystals activated with lead, cobalt and praseodymium. The coactivator sodium chloride, of course, remains with the activated zinc sulfide crystals. The activated crystals are thereupon cooled to room temperature as quickly as possible.

It now becomes necessary to remove the coactivator sodium chloride from the activated zinc sulfide crystals. This is accomplished by washing the zinc sulfide crystals with highly purified water until all traces of sodium chloride are removed from the zinc sulfide product.

The lead, cobalt and praseodymium-activated zinc sulfide crystals are then subjected to a standard sedimentation process to secure a fraction of crystal sizes in the 1 to 4 micron range. This particular size range of crystals is preferred for utilization in the present invention, since it has been found that they are most suitable for incorporation into an emulsion film useful in infrared camera apparatus. It should be understood, however, that the lead, cobalt and praseodymium-activated zinc sulfide crystals of other sizes produced by the above process may also be utilized in various infrared detection apparatus.

If it is desired to utilize the luminophores of the present invention in an infrared camera apparatus, the selected crystal product may be admixed with a suitable film binder material, such as balsam, in the presence of water. A photographic-type plate may be prepared by dipping a clean glass plate into the zinc sulfide, balsam and water emulsion. It is preferred to add water to the zinc sulfide-balsam mixture in sufficient quantity to furnish an emulsion having a viscosity in a range to produce a dried film on the glass plate in the range of about 50 microns in thickness. It has been found that a film of approximately the above-stated thickness yields plates of optimum brightness under infrared illumination.

Plates produced from the luminophore of the present invention in a binder such as balsam are extremely stable in the presence of atmospheric moisture and other contaminating gases. In addition such films retain their infrared sensitivity for an indefinite period of time. The plates are capable of being used over and over again to record infrared "pictures." Such plates have been utilized to record in excess of 2,000 successive infrared pictures without any indication of deterioration in luminophore sensitivity and resultant luminosity.

In order to luminesce as a result of receiving infrared radiation, the luminophores of the invention must first be supplied with a source of activation energy. This energy is supplied by initially illuminating the luminophore with ultraviolet light. For instance ultraviolet light of a wavelength of 2,848 angstroms as supplied from a mercury light source is entirely suitable for this purpose. However it should be understood that ultraviolet light of any wavelength or mixture of wavelengths may also prepare the luminophores for subsequent infrared illumination.

Initial illumination with ultraviolet light produces a sensitization in the luminophore by jumping available electrons within the zinc sulfide crystalline lattice into higher quantum states. Upon subsequent illumination with infrared radiation, these electrons are induced to return to their lower energy levels with the resultant release of energy in the form of luminescense. In the instance of the luminophores of the present invention, this luminescense gives rise to a "picture" that reveals the "infrared" character of the object viewed.

Assuming that the object is illuminated with a monochromatic infrared light source, the luminescense exhibited by the luminophores will reveal a "picture" of the object directly dependent upon the infrared reflectivity of various portions of the viewed object.

The luminophores of the present invention have the unique property of luminescing in the visible region in direct correspondence to the infrared output of the viewed object. For instance where the viewed object has a high output of infrared radiation or high reflectivity of an external infrared source, the luminophores of the present invention will luminesce in the red end of the visible spectrum. As the intensity of infrared radiation decreases, or as the reflectivity of the object decreases, the luminophores indicate this fact by luminescing increasingly towards the blue end of the visible spectrum. Thus a color picture is "painted" by the luminophores in direct correspondence to the infrared nature of the viewed object.

As stated above, after initial activation with ultraviolet light, the luminophores will luminesce upon subsequent illumination by infrared radiation. This luminescense will gradually decrease with time; however, it can be immediately "erased" by once again subjecting the luminophore to ultraviolet radiation. Upon ultraviolet radiation the luminescence is erased and at the same time the luminophore is resensitized for a subsequent infrared picture.

As the luminophores of the invention luminesce in the visible spectrum, the infrared picture may be observed visually or it may be preserved by photographing the plate with standard photographic techniques. In a more sophisticated system, the luminescing plate may be scanned by a video tube and recorded on magnetic tape for future reference of immediate visual display.

What is claimed is:

1. An infrared-sensitive luminophore consisting essentially of zinc sulfide having a crystalline structure, and lead, cobalt, and praseodymium incorporated within the crystal structure of said zinc sulfide, each within the range of from about $1\times10^{15}$ to $1\times10^{17}$ percent by weight of the zinc sulfide.

2. An infrared-sensitive luminophore consisting of crystalline zinc sulfide activated with lead, cobalt and praseodymium, each in the range of from $1\times10^{15}$ to $1\times10^{17}$ percent by weight of the zinc sulfide.

PO-1050
(5/69)

UNITED STATES PATENT OFFICE
CERTIFICATE OF CORRECTION

Patent No. 3,607,772          Dated Sept. 21, 1971

Inventor(s) OTTO R. KOZAK

It is certified that error appears in the above-identified patent and that said Letters Patent are hereby corrected as shown below:

In the ABSTRACT, line 9, "$10^{12}$" should read --$10^{-2}$--.

Col. 1, line 73, "$10^{12}$" should read --$10^{-2}$--.

Col. 2, line 38, "$1 \times 10^{16}$" should read --$1 \times 10^{-6}$--; line 42, "$1+10^{17}$" should read --$1 \times 10^{-7}$--; same line, "$1+10^{18}$" should read --$1 \times 10^{-8}$--; line 45 "$1 \times 10^{18}$" should read --$1 \times 10^{-8}$--; line 57, "$1 \times 10^{15}$ to $1 \times 10^{17}$" should read --$1 \times 10^{-5}$ to $1 \times 10^{-7}$--; line 62, "$10^{12}$" should read --$10^{-2}$--.

CLAIM 1 - col. 6, lines 25-26 "$1 \times 10^{15}$" should read --$1 \times 10^{-5}$--.

CLAIM 2 - col. 6, line 29 "$1 \times 10^{15}$ to $1 \times 10^{17}$" should read --$1 \times 10^{-5}$ to $1 \times 10^{-7}$--.

Signed and sealed this 25th day of April 1972.

(SEAL)
Attest:

EDWARD M. FLETCHER, JR.
Attesting Officer

ROBERT GOTTSCHALK
Commissioner of Patents